US009857923B2

(12) United States Patent
Yun et al.

(10) Patent No.: US 9,857,923 B2
(45) Date of Patent: Jan. 2, 2018

(54) TOUCH PANEL INCLUDING AN ELASTIC INTERMEDIATE LAYER (71) Applicant: LG INNOTEK CO., LTD., Seoul (KR)

(72) Inventors: Ji Sun Yun, Seoul (KR); Sang Young Lee, Seoul (KR); Yong Jin Lee, Seoul (KR); Kyoung Hoon Chai, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 190 days.

(21) Appl. No.: 14/354,876

(22) PCT Filed: Oct. 29, 2012

(86) PCT No.: PCT/KR2012/008928
§ 371 (c)(1),
(2) Date: Apr. 28, 2014

(87) PCT Pub. No.: WO2013/062385
PCT Pub. Date: May 2, 2013

(65) Prior Publication Data
US 2014/0307186 A1 Oct. 16, 2014

(30) Foreign Application Priority Data

Oct. 27, 2011 (KR) .................. 10-2011-0110320
Nov. 30, 2011 (KR) .................. 10-2011-0127353

(51) Int. Cl.
G06F 3/041 (2006.01)
G06F 3/044 (2006.01)
G06F 3/045 (2006.01)
(52) U.S. Cl.
CPC .............. *G06F 3/044* (2013.01); *G06F 3/045* (2013.01)

(58) Field of Classification Search
CPC .................................. G06F 3/044; G06F 3/045
See application file for complete search history.

(56) References Cited

U.S. PATENT DOCUMENTS 6,791,535 B2 * 9/2004 Suzuki .................... G06F 3/045
178/18.01
7,932,898 B2 * 4/2011 Philipp ................... G06F 3/044
178/18.06
(Continued)

FOREIGN PATENT DOCUMENTS

CN 1942853 A 4/2007
CN 101203821 A 6/2008
(Continued)

OTHER PUBLICATIONS

International Search Report in International Application No. PCT/KR2012/008928, filed Oct. 29, 2012.
(Continued)

*Primary Examiner* — Peter D McLoone
(74) *Attorney, Agent, or Firm* — Saliwanchik, Lloyd & Eisenschenk (57) ABSTRACT The touch panel includes a first substrate and a second substrate spaced apart from each other; a position detecting electrode on at least one of the first and second substrates; a pressure detecting electrode on a bottom surface of the first substrate; a wire connecting the position detecting electrode to a substrate; and an intermediate layer being elastically deformed such that a thickness of the intermediate layer is varied.

13 Claims, 3 Drawing Sheets

(56) References Cited

U.S. PATENT DOCUMENTS

| | | | |
|---|---|---|---|
| 8,305,093 B2* | 11/2012 | Pan | G06F 3/045 |
| | | | 324/600 |
| 9,223,435 B2* | 12/2015 | Hayashi | G06F 3/0416 |
| 9,678,586 B2* | 6/2017 | Reynolds | G06F 3/041 |
| 2001/0005200 A1 | 6/2001 | Suzuki | |
| 2005/0083307 A1 | 4/2005 | Aufderheide et al. | |
| 2006/0097991 A1 | 5/2006 | Hotelling et al. | |
| 2006/0273417 A1 | 12/2006 | Ganapathi et al. | |
| 2007/0062739 A1* | 3/2007 | Philipp | G06F 3/044 |
| | | | 178/18.06 |
| 2009/0211819 A1* | 8/2009 | Wang | G06F 3/045 |
| | | | 178/18.03 |
| 2010/0090984 A1 | 4/2010 | Na | |
| 2011/0017524 A1* | 1/2011 | Chen | G06F 3/044 |
| | | | 178/18.06 |
| 2011/0025352 A1* | 2/2011 | Pan | G06F 3/0416 |
| | | | 324/699 |
| 2011/0080373 A1* | 4/2011 | Wang | G06F 3/044 |
| | | | 345/174 |
| 2012/0092324 A1* | 4/2012 | Buchan | G02B 26/0833 |
| | | | 345/418 |
| 2012/0319966 A1* | 12/2012 | Reynolds | G06F 3/041 |
| | | | 345/173 |
| 2015/0077380 A1* | 3/2015 | Hayashi | G06F 3/044 |
| | | | 345/173 |
| 2017/0075493 A1* | 3/2017 | Lee | G06F 3/0418 |

FOREIGN PATENT DOCUMENTS

| | | |
|---|---|---|
| CN | 201765576 U | 3/2011 |
| KR | 1020070032924 A | 3/2007 |
| KR | 10-2011-0054722 A | 5/2011 |
| KR | 10-2011-0069312 A | 6/2011 |

OTHER PUBLICATIONS

Office Action dated Mar. 22, 2016 in Chinese Application No. 201280053159.9.

Office Action dated Nov. 29, 2016 in Korean Application No. 10-2011-0110320.

* cited by examiner

TOUCH PANEL INCLUDING AN ELASTIC INTERMEDIATE LAYER

CROSS-REFERENCE TO RELATED APPLICATIONS

This application is the U.S. national stage application of International Patent Application No. PCT/KR2012/008928, filed Oct. 29, 2012, which claims priority to Korean Application Nos. 10-2011-0110320, filed Oct. 27, 2011, and 10-2011-0127353, filed Nov. 30, 2011, the disclosures of each of which are incorporated herein by reference in their entirety.

TECHNICAL FIELD

The disclosure relates to a touch panel.

BACKGROUND ART

In general, a touch panel according to the related art is largely classified into a resistive type touch panel and a capacitive type touch panel. The resistive type touch panel includes an upper resistive film and a lower resistive film separated from each other by an insulation spacer, and when a user touches a device, the position is detected through the physical/electrical contact between the upper resistive film and the lower resistive film. In contrast, the capacitive type touch panel includes an X-coordinate sensing film and a Y-coordinate sensing film bonded to each other by a transparent adhesive, and when a finger touches the capacitive type touch panel, the position is detected by sensing the change of the electrostatic capacity between electrodes.

In this case, the resistive type touch panel of the related art has a great advantage in sensing the writing action of a user and the capacitive type touch panel of the related art has a great advantage in sensing the pointing action of a user.

Recently, as electronic/electrical technique has been rapidly developed and the electronic appliances have been extensively used, there are various demands of users to use the hybrid touch panel in which the resistive and capacitive touch panels are integrated.

However, if the resistive and capacitive touch panels are integrated into one hybrid touch panel without taking any specific measures into consideration, a serious problem, such as a significant increase in an overall size of a device, occurs inevitably. Thus, although there are various demands of the user, many difficulties are present in implementation of the hybrid touch panel.

DISCLOSURE OF INVENTION

Technical Problem

The embodiment provides a touch panel in which a resistive type touch panel and a capacitive type touch panel are integrated.

Solution to Problem

According to one embodiment, there is provided a touch panel. The touch panel includes a first substrate and a second substrate spaced apart from each other; a position detecting electrode on at least one of the first and second substrates; a wire connecting the position detecting electrode to a substrate; and an intermediate layer being elastically deformed such that a thickness of the intermediate layer is varied.

Advantageous Effects of Invention

In the touch panel according to the embodiment, the first and second electrodes can be placed on mutually different surfaces of the substrate. Thus, an additional insulation layer for insulating the first and second electrodes from each other can be omitted.

Further, the touch panel includes the intermediate layer between the first and second substrates. Since the first and second substrates can be combined with each other through the intermediate layer, the process can be simplified. In addition, since an additional adhesive layer can be omitted, a thickness of the touch panel can be reduced.

The intermediate layer may have the light transmittance of 80% or more in the visible ray band, so that the visibility of the touch panel can be improved.

The intermediate layer may have a refractive index in the range of 1.30 to 1.52. Thus, when the touch panel of the embodiment is combined with a display device, the touch panel having a superior display performance can be achieved. Further, the light transmittance of the touch panel as well as an anti-reflection function of the touch panel can be improved.

The intermediate layer may have a color, so that a color difference from the pressure detecting electrode or the position detecting electrode can be compensated. That is, the haze of the touch panel can be compensated. Thus, the color difference of the touch panel can be removed and a high resolution can be provided, so that the visibility can be improved.

Further, the intermediate layer can insulate the pressure detecting electrode from the position detecting electrode, so that an electrical short can be prevented.

An air layer by a spacer provided in the resistive type touch panel of the related art can be omitted due to the intermediate layer, and problems in visibility and wear resistance due to the air layer can be overcome.

The touch panel according to the embodiment can be driven regardless of electric charges of an input device. That is, a general pen writing function can be applied to the touch panel. Thus, the touch panel can substitute for a writing note and an inconvenience of carrying a specific conductive bar (stylus) can be solved.

Further, the pressure detecting electrode can allow a short or long distance touch according to a pressure and a distance between fingers such that three-dimensional touch can be realized.

A position reporting error, that is, a hand shadow error, which represents a phenomenon in which electrostatic capacitance is generated even when a finger or a conductor just approaches the touch panel, can be prevented.

MODE FOR THE INVENTION

In the description of the embodiments, it will be understood that when a layer, a film, a region, a pattern or a structure is referred to as being "on" or "under" another substrate, another layer, a film, or another pattern, it can be "directly" or "indirectly" on the other layer, the other film, the other pattern, or one or more intervening layers may also be present. The positions of each layer have been described with reference to the drawings.

The size or thickness of the elements shown in the drawings may be exaggerated for the purpose of obvious and convenient explanation and may not utterly reflect the actual size.

Hereinafter, embodiments will be described in detail with reference to the accompanying drawings.

Figure 1:
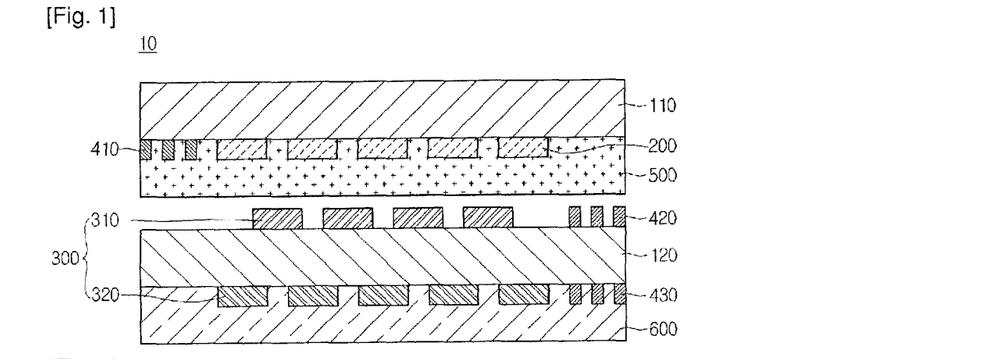
FIG. 1 is a sectional view showing a touch panel according to the first embodiment.

First, a touch panel will be described with reference to FIG. 1. FIG. 1 is a sectional view showing a touch panel according to the first embodiment.

Referring to FIG. 1, the touch panel 10 according to the first embodiment includes a first substrate 110, a pressure detecting electrode 200, a second substrate 120, a position detecting electrode 300 and an intermediate layer 500.

The first substrate 110 may be placed at the most upper portion of the touch panel 10.

The first substrate 110 may be transparent. The first substrate 110 may be a glass substrate including alkali glass such as soda glass or silicon acid boron glass, alkali-free glass, or chemical strengthening glass. The first substrate 110 may include a polyester film, such as transparent polyethyleneterephthalate or polyethylenenaphthalate (PEN), a polyimide film having thermal resistance and transparency, or a composite polymer having transparent characteristic such as polymethylmethacrylate or polycarbonate.

A protection film or anti-glare coating layer may be further placed on a surface of the first substrate 110.

A thickness of the first substrate 110 may be in the range of 100 μm to 700 μm.

An input device such as a pen or a finger may touch on the surface of the first substrate 110.

The pressure detecting electrode 200 is placed on a bottom surface of the first substrate 110.

The pressure detecting electrode 200 may include a transparent conductor. The pressure detecting electrode 200 may have high conductivity, and may include a material having a light transmittance of 80% or more in the visible ray band. For example, the pressure detecting electrode 200 may include an oxide material such as indium tin oxide film, indium zinc oxide film, or zinc oxide film. Further, the pressure detecting electrode 200 may include a carbon nano-tube, a silver nano-wire, a grapheme, or a nano-mesh.

The pressure detecting electrode 200 may have a thickness in the range of 10 nm to 50 nm according to a material.

The pressure detecting electrode 200 may be pressed by the load when a pen or a finger is touched on the surface of the first substrate 110.

The first wire 410 which is electrically connected to the pressure detecting electrode 200 may be placed on the first substrate 110. The first wire 410 may include a metal having high electrical conductivity. The first wire 410 may include a material having a sheet resistance of 0.4 Ω/sq or less. For example, the first wire 410 may include white gold, gold, silver, aluminum or copper. The first wire 410 may include chrome, molybdenum, or nickel for enhancing adhesion. That is, the first wire 410 may include at least one layer. The first wire 410 may have a thickness in the range of 100 nm to 2000 nm.

The second substrate 120 may be placed under the first substrate 110.

The second substrate 120 may be transparent. The second substrate 120 may be a glass substrate including alkali glass such as soda glass or silicon acid boron glass, alkali-free glass, or chemical strengthening glass. The second substrate 120 may be a substrate based on polyester film such as transparent polyethyleneterephthalate or polyethylenenaphthalate (PEN), or a cross-polymer having transparent characteristic such as polyimide film having thermal resistance and transparency, polymethylmethacrylate, polycarbonate.

The second substrate 120 may have a thickness in the range of 100 μm to 700 μm.

The position detecting electrode 300 may be placed on at least one surface of the second substrate 120.

The position detecting electrode 300 may include a transparent conductor. The position detecting electrode 300 may have high conductivity, and may include a material having a light transmittance of 80% or more in the visible ray band. For example, the position detecting electrode 300 may include an oxide material such as indium tin oxide film, indium zinc oxide film, or zinc oxide film. Further, the position detecting electrode 300 may include a carbon nano-tube, a silver nano-wire, a grapheme, or a nano-mesh.

The position detecting electrode 300 may have a thickness in the range of 10 nm to 50 nm according to a material.

The position detecting electrode 300 may include a first electrode 310 and a second electrode 320. The first and second electrodes 310 and 320 may be placed on mutually different surfaces of the second substrate 120. Thus, an additional insulation layer for insulating the first and second electrodes 310 and 320 from each other may be omitted.

Referring to FIG. 1, the first electrode 310 may be placed on the top surface of the second substrate 120. The first electrode 310 may be formed along a first direction. The first electrode 310 may detect a position in the first direction.

The second electrode 320 may be placed on the bottom surface of the second substrate 120. The second electrode 320 may be formed along a second direction crossing the first direction. The second electrode 320 may detect a position in the second direction.

A protection layer 600 for protecting the second electrode 320 may be further provided on the bottom surface of the second electrode 320.

The first and second electrodes 310 and 320 may be formed in various shapes by which it may be sensed whether an input device such as a finger is touched thereon.

A second wire 420 and a third wire 430 which are electrically connected to the position detecting electrode 300 may be placed on the second substrate 120. The second and third wires 420 and 430 may include a metal having high electrical conductivity, respectively. The second and third wires 420 and 430 may include a material having a sheet resistance of 0.4 Ω/sq or less. For example, the second and third wires 420 and 430 may include white gold, gold, silver, aluminum or copper. The second and third wires 420 and 430 may include chrome, molybdenum, or nickel for enhancing adhesion. That is, the second and third wires 420 and 430 may include at least one layer, respectively. Each of the second and third wire2 420 and 430 may have a thickness in the range of 100 nm to 2000 nm.

Although not shown in the drawings, a printed circuit board (not shown) which is connected to the first and third wires 410 to 430 may be further provided. Various types of printed circuit boards may be applied as the printed circuit board. For example, a flexible printed circuit board (FPCB) may be used as the printed circuit board.

The intermediate layer 500 may be placed between the first and second substrates 110 and 120. The intermediate layer 500 may bond the first and second substrates 110 and 120 to each other. That is, the intermediate layer 500 may include two surfaces having adhesion. Since the first and second substrates may be combined with each other through the intermediate layer 500, the process can be simplified. Further, since an additional adhesive layer may be omitted, a thickness of the touch panel may be reduced.

A thickness of the intermediate layer 500 may be varied through an elastic modification. That is, as an input device is touched on the first substrate 110, when a load is applied to the first substrate 110, the thickness of the intermediate layer 500 may be varied due to the load. That is, due to the load, the thickness of the intermediate layer 500 may be thin. When the load is removed from the first substrate 110, the intermediate layer 500 may be recovered into the original state from the modification due to the load. The intermediate layer 500 may be varied to 50% of the thickness.

The intermediate layer 500 may vary a distance between the pressure detecting electrode 200 and the position detecting electrode 300. That is, the distance between the pressure detecting electrode 200 and the position detecting electrode 300 may be reduced.

The light transmittance of the intermediate layer 500 may be 80% or more in the visible ray band.

The intermediate layer 500 may have a refractive index in the range of 1.30 to 1.52. Thus, when the touch panel according to the embodiment is combined with a display device, the touch panel having a superior display performance can be implemented. Further, the light transmittance of the touch panel as well as an anti-reflection function of the touch panel may be improved.

The intermediate layer 500 may have a color. Thus, a color difference from the pressure detecting electrode 200 or the position detecting electrode 300 may be compensated. That is, the haze of the touch panel may be compensated. For example, when the pressure detecting electrode and the position detecting electrode 300 include an indium tin oxide film and the intermediate layer 500 has a blue based color, the yellowish of the indium tin oxide film may be compensated. That is, the color difference of the touch panel is removed and a high resolution is provided, so that the visibility may be improved.

Further, the intermediate layer 500 insulates the pressure detecting electrode 200 from the position detecting electrode 300 to prevent the pressure detecting electrode 200 and the position detecting electrode 300 from being short-circuited.

An air layer by a spacer provided in the resistive type touch panel of the related art may be omitted due to the intermediate layer 500, and problems in visibility and wear resistance due to the air layer may be overcome.

The intermediate layer 500 may include resin. In detail, the intermediate layer 500 may include photocurable resin. For example, the intermediate layer 500 may include silicon resin, polyurethane resin, polyvinyl chloride resin, or acrylic resin.

However, the embodiment is not limited to above, but the intermediate layer 500 may have a film shape. The intermediate layer 500 may include an optically clear adhesive (OCA).

The intermediate layer 500 may have a thickness in the range of 25 μm to 200 μm according to a kind of a material.

In the touch panel 10 according to the embodiment, when the input device is pressed by the first substrate 110, the thickness of the intermediate layer 500 is modified in a thickness direction, so that the pressure detecting electrode 200 is closer to the position detecting electrode 300. Thus, the pressure detecting electrode 200 and the position detecting electrode 300 are combined in electrostatic capacity with each other, so that the position touched by the input device can be detected. Therefore, the touch panel may be driven regardless of electric charges of an input device. That is, a general pen writing function may be applied to the touch panel. Thus, the touch panel may substitute for a writing note and an inconvenience of carrying a specific conductive bar (stylus) may be solved.

Further, the pressure detecting electrode 200 may allow a short or long distance touch according to a pressure and a distance between fingers, such that three-dimensional touch may be realized.

Further, a position reporting error, that is, a hand shadow error, which represents a phenomenon in which electrostatic capacitance is generated even when a finger or a conductor just approaches the touch panel, can be prevented Hereinafter, a touch panel according to the second embodiment will be described with reference to FIG. 2. In the following description, the details of structures and components the same as those of the first embodiment or extremely similar to those of the first embodiment will be omitted for the purpose of clear and simple explanation FIG. 2 is a sectional view showing the touch panel according to the second embodiment.

Figure 2:
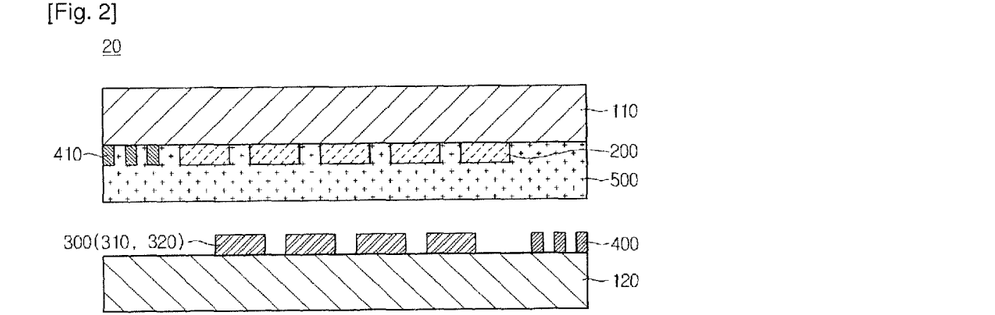
FIG. 2 is a sectional view showing a touch panel according to the second embodiment.

Referring to FIG. 2, in the touch panel 20 according to the second embodiment, the position detecting electrode 300 may be placed only on one surface of the second substrate 120. That is, the first and second electrodes 310 and 320 of the position detecting electrode 300 may be placed on the surface of the second substrate 120, so that the thickness of the touch panel may be decreased. Further, the wire 400 for electrically connecting the position detecting electrode 300 may be placed on one surface of the second substrate 120.

Although not shown in the drawings, an insulation layer may be further placed at a portion in which the first and second electrodes 310 and 320 are overlapped, thereby preventing an electrical short.

Figure 3:
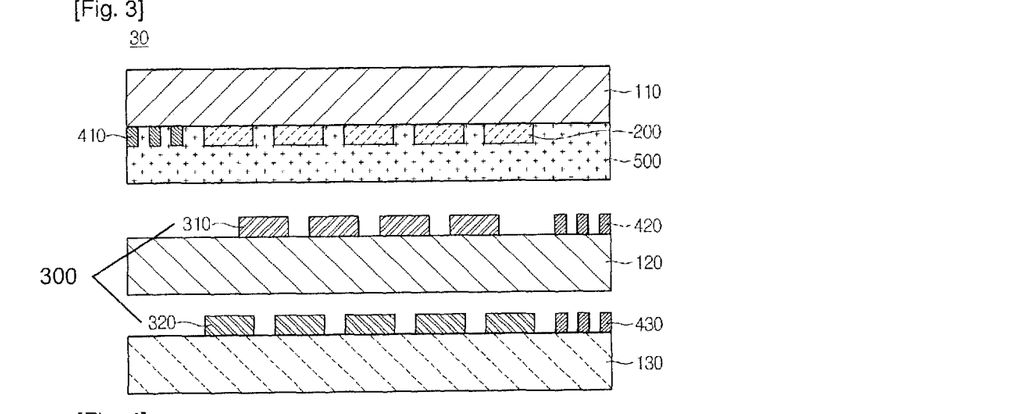
FIG. 3 is a sectional view showing a touch panel according to the third embodiment.

Next, a touch panel according to the third embodiment will be described with reference to FIG. 3, FIG. 3 is a sectional view showing the touch panel according to the third embodiment.

Referring to FIG. 3, the touch panel 30 according to the third embodiment further includes a third substrate 130 placed below the second substrate 120. The position detecting electrode 300 may be placed on the second and third substrates 120 and 130. However, the embodiment is not limited thereto. The second electrode 320 may be placed on the second substrate 120 and the first electrode 310 may be placed on the third substrate 130.

The first and second electrodes 310 and 320 may be placed on different substrates, so that touch sensitivity may be improved.

Hereinafter, a method for fabricating the touch panel according to the embodiment will be described with reference to FIGS. 4 to 6.

Figure 4:
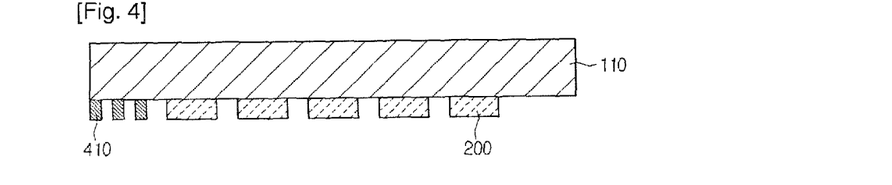
FIGS. 4 to 6 are sectional views illustrating a method for fabricating a touch panel according to the embodiment.
Figure 5:
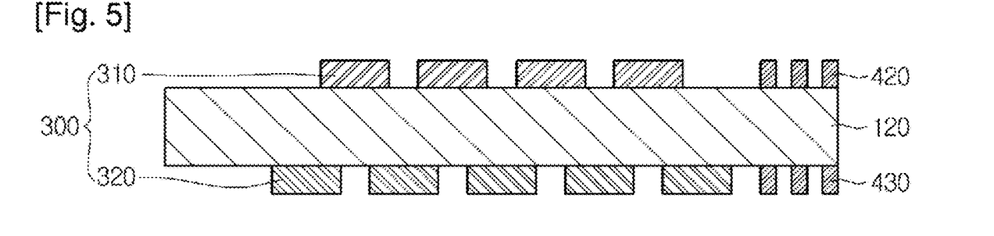
Figure 6:
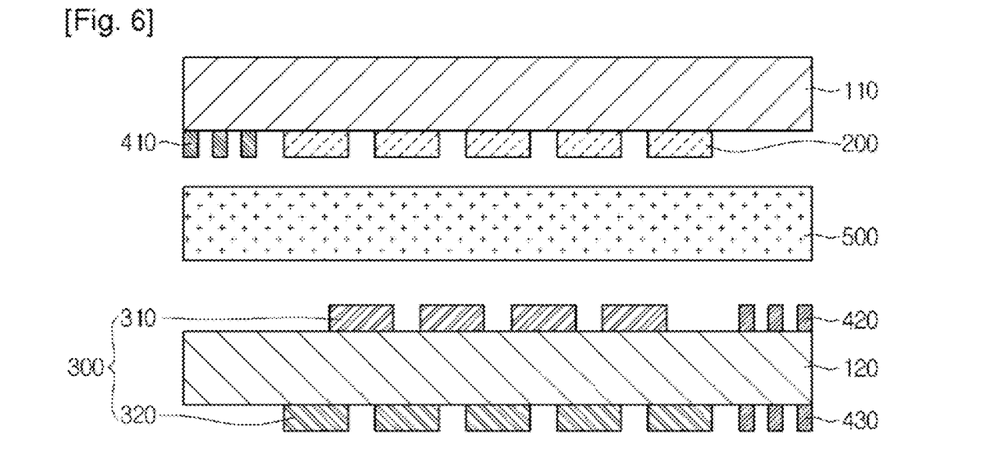

FIGS. 4 to 6 are sectional views illustrating the method for fabricating the touch panel according to the embodiment.

First, referring to FIG. 4, the pressure detecting electrode 200 and the first wire 410 may be formed on the first substrate 110.

The pressure detecting electrode 200 may be formed by depositing a transparent electrode material on the first substrate 110. As one example, an indium tin oxide layer may be formed on an entire bottom surface of the first substrate 110 through a sputtering scheme. Photoresist is coated through a photolithography technique generally known in the art and an exposure and development process is performed to form a desired pattern in which the indium tin oxide layer formed at a lower layer is exposed. Then, the exposed indium tin oxide layer is etched with an etching solution by using the photoresist pattern as an etching mask. The etching solution may include carboxylic acid solution, ferric chloride solution, hydrobromic acid solution, hydriodic acid solution, or aqua regia solution. Next, the photoresist is removed, so that the pressure detecting electrode 200 having the pattern may be formed. However, the embodiment is not limited to the above, and the pressure detecting electrode 200 may be formed through various processes such as a printing process or a laminating process.

Then, a metal material is formed on the first substrate 110 and is etched with etching solution, such that a pattern of the first wire 410 may be formed. The etching solution may be mixture solution of phosphoric acid, nitric acid, or acetic acid. However, the embodiment is not limited thereto, and the first wire 410 may be formed through various processes such as a printing process or a laminating process.

Referring to FIG. 5, the position detecting electrode 300, the second wire 420 and the third wire 430 may be formed on the second substrate 120.

The position detecting electrode 300 may be formed through a method which is similar with or the same as that of forming the pressure detecting electrode 200, as described above.

The second and third wires 420 and 430 may be formed through a method which is similar with or the same as that of forming the first wire 410, as described above.

Referring to FIG. 6, the intermediate layer 500 may be interposed between the first and second substrates 110 and 120, so that the first substrate 110 may be adhesive to the second substrate 120. After photocurable resin is coated on the first and second substrates 110 and 120, the intermediate layer 500 may be formed by radiating light to the photocurable resin to UV-harden the photocurable resin. When the intermediate layer 500 has a film shape, after the intermediate layer 500 is interposed between the first and second substrates 110 and 120, the first and second substrates 110 and 120 may be immediately combined with each other.

Figure 7:
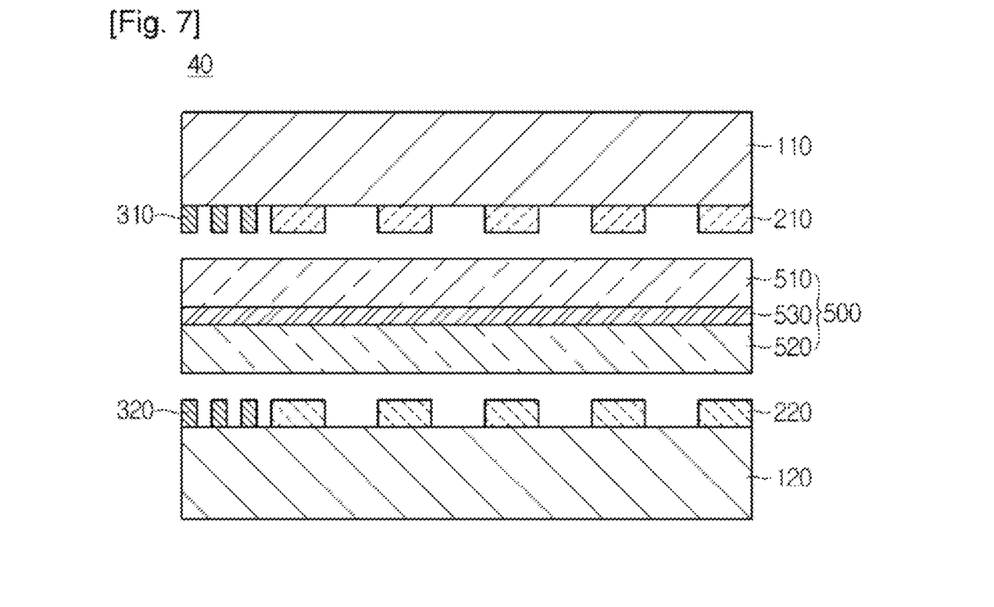
FIG. 7 is a sectional view showing a touch panel according to the fourth embodiment.

A touch panel according to the fourth embodiment will be described with reference to FIG. 7. FIG. 7 is a sectional view showing the touch panel according to the fourth embodiment.

Referring to FIG. 7, the touch panel according to the fourth embodiment a first substrate 110, a first electrode 210, a second substrate 120, a second electrode 220 and intermediate layer 500.

The first substrate 110 may be placed on the most upper portion of the touch panel 10.

The first substrate 110 may be transparent. The first substrate 110 may be a glass substrate including alkali glass such as soda glass or silicon acid boron glass, alkali-free glass, or chemical strengthening glass. The first substrate 110 may be a substrate based on polyester film such as transparent polyethyleneterephthalate or polyethylenenaphthalate (PEN), or a cross-polymer having transparent characteristic such as polyimide film having thermal resistance and transparency, polymethylmethacrylate, or polycarbonate.

A protection film or anti-glare coating layer may be further placed on a surface of the first substrate 110.

A thickness of the first substrate 110 may be in the range of 100 μm to 700 μm.

An input device such as a pen or a finger may touch on the surface of the first substrate 110.

The first electrode 210 is placed on at least one surface of the first substrate 110. Referring to FIG. 7, the first electrode 210 may be placed on a bottom surface of the first substrate 110.

The first electrode 210 may include a transparent conductor. The first electrode 210 may have high conductivity, and may include a material having a light transmittance of 80% or more in the visible ray band. For example, the first electrode 210 may include an oxide material such as indium tin oxide film, indium zinc oxide film, or zinc oxide film. Further, the first electrode 210 may include a carbon nanotube, a silver nano-wire, a grapheme, or a nano-mesh.

The first electrode 210 may have a thickness in the range of 10 μm to 50 μm according to a material.

The first electrode 210 may be formed in the first direction. The first electrode 210 may detect a position in the first direction.

The first electrode 210 may be formed in various shapes by which it may be sensed whether an input device such as a finger is touched thereon.

The first wire 310 which is electrically connected to the first electrode 210 may be placed on the first substrate 110. The first wire 310 may include a metal having high electrical conductivity. The first wire 310 may include a material having a sheet resistance of 0.4 Ω/sq or less. For example, the first wire 310 may include white gold, gold, silver, aluminum or copper. The first wire 310 may include chrome, molybdenum, or nickel for enhancing adhesion. That is, the first wire 310 may include at least one layer. The first wire 310 may have a thickness in the range of 100 nm to 2000 nm.

The second substrate 120 may be placed spaced apart from the first substrate 110. The second substrate 120 may be placed below the first substrate 110.

The second substrate 120 may be transparent. The second substrate 120 may be a glass substrate including alkali glass such as soda glass or silicon acid boron glass, alkali-free glass, or chemical strengthening glass. The second substrate 120 may be a substrate based on polyester film such as transparent polyethyleneterephthalate or polyethylenenaphthalate (PEN), or a cross-polymer having transparent characteristic such as polyimide film having thermal resistance and transparency, polymethylmethacrylate, polycarbonate.

The second electrode 120 may have a thickness in the range of 100 μm to 700 μm according to a material The second electrode 220 is placed on the second substrate 120. In detail, the second electrode 220 may be placed on the top surface of the second substrate 120. That is, the first and second electrodes 210 and 220 may be placed to be opposite to each other.

The second electrode 220 may include a transparent conductor. The second electrode 220 may have high conductivity, and may include a material having a light transmittance of 80% or more in the visible ray band. For example, the second electrode 220 may include an oxide material such as indium tin oxide film, indium zinc oxide film, or zinc oxide film. Further, the second electrode 220 may include a carbon nano-tube, a silver nano-wire, a grapheme, or a nano-mesh.

The second electrode 220 may have a thickness in the range of 10 μm to 50 μm according to a material.

The second electrode 220 may be formed in the second direction crossing the first direction. The second electrode 220 may detect a position in the second direction.

The second electrode 220 may be formed in various shapes by which it may be sensed whether an input device such as a finger is touched thereon.

The second wire 320 which is electrically connected to the second electrode 220 may be placed on the second substrate 120. The second wire 310 may include a metal having high electrical conductivity. The second wire 320 may include a material having a sheet resistance of 0.4 Ω/sq or less. For example, the second wire 320 may include white gold, gold, silver, aluminum or copper. The second wire 320 may include chrome, molybdenum, or nickel for enhancing adhesion. That is, the second wire 320 may include at least one layer. The second wire 320 may have a thickness in the range of 100 nm to 2000 nm.

Although not shown in the drawings, a printed circuit board (not shown) which is connected to the first and second wires 310 to 320 may be further provided. Various types of printed circuit boards may be applied as the printed circuit board. For example, a flexible printed circuit board (FPCB) may be used as the printed circuit board.

The intermediate layer 500 is placed below the first substrate 110. In detail, the intermediate layer 500 may be placed between the first and second substrate 110 and 120.

The intermediate layer (500) may be formed as a pressure recognizing layer.

The intermediate layer 500 includes a conductive layer 530 and a functional layer 510 and 520.

The functional layer 510 and 520 includes a first functional layer placed on a first surface of the conductive layer 530 and a second functional layer 520 placed on a second surface opposite to the first surface.

The first and second functional layers 510 and 520 may bond the first and second substrates 110 and 120 to each other. The first and second functional layers 510 and 520 may have adhesive strengths. Since the first and second substrates 110 and 120 are combined with each other through the functional layer 510 and 520, the process can be simplified. Further, since an additional adhesive layer may be omitted, a thickness of the touch panel may be reduced.

The functional layer 510 and 520 may include a composite of an insulation material and a conductive material. However, the embodiment is not limited thereto and the functional layer 510 and 520 may include only the insulation material.

The insulation material may include resin. In detail, the insulation material may include photocurable resin. For example, the insulation material may include silicon resin, polyurethane resin, polyvinyl chloride resin, or acrylic resin.

The conductive material may include a metal, carbon nano-tubes or carbon black.

The insulation material and the conductive material may be used to be combined according to optical characteristics.

However, the embodiment is not limited to above, but the functional layer 510 and 520 may have a film shape. The functional layer 510 and 520 may include an optically clear adhesive (OCA).

Each of the first and second functional layers 510 and 520 may have a thickness in the range of 1 μm to 10 μm.

The conductive layer 530 is placed between the first and second functional layers 510 and 520. The conductive layer 530 includes a conductive material.

The conductive layer 530 may include a transparent conductor. The conductive layer 530 may have high conductivity, and may include a material having a light transmittance of 80% or more in the visible ray band. For example, the conductive layer 530 may include an oxide material such as indium tin oxide film, indium zinc oxide film, or zinc oxide film. Further, the conductive layer 530 may include a carbon nano-tube, a silver nano-wire, a grapheme, or a nano-mesh. The conductive layer 530 may include a metal, carbon nano-tubes and carbon black.

The conductive layer 530 may have a thickness in the range of 10 nm to 50 nm The intermediate layer 500 may be placed between the first and second substrates 110 and 120. The intermediate layer 500 may bond the first and second substrates 110 and 120 to each other. A thickness of the intermediate layer 500 may be varied through an elastic modification. That is, as an input device is touched on the first substrate 110, when a load is applied to the first substrate 110, the thickness of the intermediate layer 500 may be varied due to the load. That is, due to the load, the thickness of the intermediate layer 500 may be thin. When the load is removed from the first substrate 110, the intermediate layer 500 may be recovered into the original state from the modification due to the load. The intermediate layer 500 may be varied to 50% of the thickness.

Thus, as the thickness of the intermediate layer 500 is decreased, a current path may be formed between the first and second electrodes 210 and 220, so that the resistance may be varied to recognize a pressure applied to the touch panel. However, when a touch which is not enough to vary the thickness of the intermediate layer 500 is applied, the first and second electrodes 210 and 220 may recognize a position as a capacitive type touch panel according to the related art.

The intermediate layer 500 may have the light transmittance of 80% or more in the visible-ray band, so that the visibility of the touch panel can be improved.

Further, the intermediate layer 500 may prevent the deterioration of the visibility due to non-transparency of the conductive ball of the related art. That is, the light transmittance and visibility may be improved.

The intermediate layer 500 may have a refractive index in the range of 1.30 to 1.52. Thus, when the touch panel according to the embodiment is combined with a display device, the touch panel having a superior display performance can be implemented. The light transmittance of the touch panel as well as an anti-reflection function may be improved.

The intermediate layer 500 may have a color. Thus, a color difference from the first and second electrodes 210 and 220 may be compensated. That is, the haze of the touch panel may be compensated. For example, when the first and second electrodes 210 and 220 include an indium tin oxide film and the intermediate layer 500 has a blue based color, the yellowish of the indium tin oxide film may be compensated. That is, the color difference of the touch panel is removed and a high resolution is provided, so that the visibility may be improved.

Further, the intermediate layer 500 may insulate the first electrode 210 from the second electrode 220, so that electrical short may be prevented.

An air layer by a spacer provided in the resistive type touch panel of the related art may be omitted due to the intermediate layer 500, and problems in visibility and wear resistance due to the air layer may be overcome. Further, the thickness of the touch panel may be optimized.

In the touch panel 10 according to the embodiment, when the input device is pressed by the first substrate 110, the thickness of the intermediate layer 500 is modified in a thickness direction, so that the current path may be formed between the first and second electrodes 210 and 220, so the resistance may be varied to recognize a pressure applied to the touch panel. Therefore, the touch panel may be driven regardless of electric charges of input device. That is, a general pen writing function may be applied to the touch panel. Thus, the touch panel may substitute for a writing note and an inconvenience of carrying a specific conductive bar (stylus) may be solved. Further, even if a user wears gloves, the user may drive the touch panel, so that the user may easily use the touch panel in the cold winter season.

Further, the intermediate layer 500 may allow a short or long distance touch according to pressure strength and a distance between fingers, such that three-dimensional touch may be realized. Thus, a 3D interface may be implemented.

Further, a position reporting error, that is, a hand shadow error, which represents a phenomenon in which electrostatic capacitance is generated even when a finger or a conductor just approaches the touch panel, can be prevented.

Figure 8:
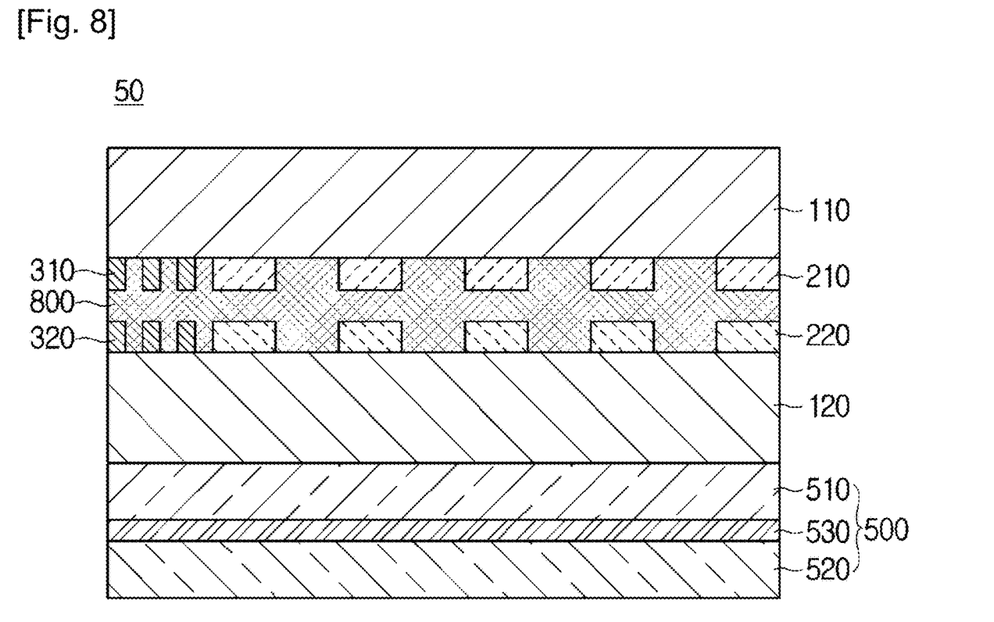
FIG. 8 is a sectional view showing a touch panel according to the fifth embodiment.

Hereinafter, a touch panel according to the fifth embodiment will be described with reference to FIG. 8. In the following description, the details of structures and components the same as those of the fourth embodiment or extremely similar to those of the fourth embodiment will be omitted for the purpose of clear and simple explanation FIG. 8 is a sectional view showing the touch panel according to the fifth embodiment.

The intermediate layer 500 is placed below the first substrate 110. In detail, the intermediate layer 500 is placed below the second substrate 120. That is, the intermediate layer 500 may be placed between the touch panel and a liquid crystal panel below the touch panel.

An adhesive layer 800 may be further placed between the first and second substrates 110 and 120. The adhesive layer 800 may be an optically clear adhesive.

Thus, touch panels having various structures may be implemented.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A capacitive touch panel comprising:
   a first substrate, a second substrate below the first substrate, and a third substrate below the second substrate;
   a position detecting electrode comprising a first position detecting electrode extending in a first direction, and a second position detecting electrode extending in a second direction crossing the first position detecting electrode;
   a pressure detecting electrode comprising a plurality of sub-pressure detecting electrodes on a bottom surface of the first substrate;
   a wire connecting the position detecting electrode to a substrate; and
   an intermediate layer being elastically deformed such that a thickness of the intermediate layer is varied;
   wherein the first position detecting electrode is disposed on the second substrate and the second position detecting electrode is disposed on the third substrate;
   wherein the first position detecting electrode is disposed apart from the second positioning electrode,
   wherein the sub-pressure detecting electrodes are disposed apart from each other,
   wherein the intermediate layer covers the entire bottom surface of the first substrate;
   wherein the intermediate layer is in direct physical contact with the position detecting electrode, the pressure detecting electrode, and the wire;
   wherein the intermediate layer has a color; and
   wherein the intermediate layer insulates the position detecting electrode and the pressure detecting electrode.

2. The capacitive touch panel of claim 1, wherein a distance between the position detecting electrode and the pressure detecting electrode varies due to the intermediate layer.

3. The capacitive touch panel of claim 1, wherein the intermediate layer has a light transmittance of 80% or more in a visible ray band.

4. The capacitive touch panel of claim 1, wherein the intermediate layer has a refractive index in a range of 1.3 to 1.52.

5. The capacitive touch panel of claim 1, wherein the intermediate layer includes resin.

6. The capacitive touch panel of claim 1, wherein the intermediate layer includes at least one selected from the group consisting of silicon resin, polyurethane resin, vinyl chloride resin and acrylic resin.

7. The capacitive touch panel of claim 1, wherein the intermediate layer compensates for a color difference with respect to the pressure detecting electrode or the position detecting electrode.

8. A capacitive touch panel comprising:
   a first substrate;
   a second substrate below the first substrate;
   a position detecting electrode comprising a first position detecting electrode on at least one surface of the first substrate and a second position detecting electrode on at least one surface of the second substrate;
   a pressure detecting electrode comprising a plurality of sub-pressure detecting electrodes on a bottom surface of the first substrate;
   a wire connecting the position detecting electrode to a substrate;
   an intermediate layer disposed below the second substrate; and an adhesive layer comprising an optically clear adhesive (OCA) between the first substrate and the second substrate;

wherein the intermediate layer is disposed between the touch panel and a liquid crystal panel;

wherein the liquid crystal panel is disposed below the touch panel;

wherein the first position detecting electrode is disposed apart from the second positioning detecting electrode;

wherein the sub-pressure electrodes are disposed apart from each other;

wherein the adhesive layer insulates the first position detecting electrode, the second positioning electrode, and the pressure detecting electrode;

wherein the intermediate layer covers the entire bottom surface of the second substrate;

wherein the intermediate layer has a color;

wherein the intermediate layer is elastically deformed such that a thickness of the intermediate layer varies;

wherein the intermediate layer is formed as a pressure recognizing layer;

wherein the intermediate layer comprises:
a conductive layer; and
a functional layer;

wherein the functional layer comprises:
a first functional layer on a first surface of the conductive layer; and
a second functional layer on a second surface of the conductive layer, the second surface being opposite to the first surface; and wherein the first functional layer and the second functional layer include an insulation material.

9. The capacitive touch panel of claim 8, wherein the functional layer further includes a composite of an insulation material and a conductive material.

10. The capacitive touch panel of claim 9, wherein the insulation material includes resin.

11. The capacitive touch panel of claim 9, wherein the conductive material includes a material selected from the group consisting of a metal, carbon nano-tubes, and carbon black.

12. The capacitive touch panel of claim 8, wherein the conductive layer includes a conductive material.

13. The capacitive touch panel of claim 8, wherein the first position detecting electrode faces the second position detecting electrode.

* * * * *